United States Patent
Pronkine

(10) Patent No.: US 7,392,029 B2
(45) Date of Patent: Jun. 24, 2008

(54) METHOD AND APPARATUS FOR TRUE DIVERSITY RECEPTION WITH SINGLE ANTENNA

(75) Inventor: Viatcheslav Pronkine, Edgewater, NJ (US)

(73) Assignee: NXP B.V., Eindhoven (NL)

( * ) Notice: Subject to any disclaimer, the term of this patent is extended or adjusted under 35 U.S.C. 154(b) by 188 days.

(21) Appl. No.: 10/537,601

(22) PCT Filed: Nov. 26, 2003

(86) PCT No.: PCT/IB03/05437

§ 371 (c)(1),
(2), (4) Date: Jun. 3, 2005

(87) PCT Pub. No.: WO2004/051884

PCT Pub. Date: Jun. 17, 2004

(65) Prior Publication Data

US 2006/0017633 A1    Jan. 26, 2006

Related U.S. Application Data

(60) Provisional application No. 60/430,878, filed on Dec. 4, 2002.

(51) Int. Cl.
*H04B 1/06* (2006.01)

(52) U.S. Cl. .................. 455/272; 455/269; 455/270; 455/282; 455/277.1

(58) Field of Classification Search .................. 343/702, 343/756, 858; 333/21 A, 125, 127, 136; 455/269, 270, 272, 273, 277.1, 282
See application file for complete search history.

(56) References Cited

U.S. PATENT DOCUMENTS

| | | | | |
|---|---|---|---|---|
| 4,208,663 A | * | 6/1980 | Ogita | 343/853 |
| 5,216,434 A | * | 6/1993 | Fukumura | 343/876 |
| 5,742,583 A | * | 4/1998 | Scott | 370/342 |
| 6,150,983 A | * | 11/2000 | Massey | 343/702 |
| 6,195,540 B1 | * | 2/2001 | Ogino et al. | 455/344 |
| 6,480,169 B2 | * | 11/2002 | Fowler | 343/806 |

* cited by examiner

*Primary Examiner*—Edward F. Urban
*Assistant Examiner*—RuiMeng Hu

(57) ABSTRACT

A system for wireless communication, particularly for receiving communication signals, said system comprising: A main antenna structure (330), said antenna structure adapted to receive a communication signal (325*a*) as a first internal signal; and an antenna cable, said antenna cable having a first end operationally coupled to said main antenna structure and a second end, said antenna cable including a main conductor (335) for passing said first internal signal, and a second receiving conductor (340), said second receiving conductor adapted to receive said communication signal as a second internal signal, and wherein said second receiving conductor as a receiving element is spatially separated from the main antenna structure. The disclosed antenna system and apparatus for the extraction of the second, spatially-separated received signal achieves spatial diversity to alleviate multipath effects in wireless communication systems.

3 Claims, 2 Drawing Sheets

METHOD AND APPARATUS FOR TRUE DIVERSITY RECEPTION WITH SINGLE ANTENNA

CROSS REFERENCE TO RELATED APPLICATION

This application claims the benefit of U.S. provisional application Ser. No. 60/430,878 filed Dec. 4, 2002, which is incorporated herein by reference.

The invention relates generally to a method and apparatus for implementing a true diversity reception with fewer antennas.

Diversity reception may be defined as radio reception in which a signal is received by combining or selecting signals from the same source that have been received at two spatially separated points, and which may vary in their fading characteristics at any given instant In a received signal fading refers to the variation, over time and space, of either the amplitude or the relative phase, or both, of one or more of the frequency components of the signal. Thus, diversity reception may be used to minimize the effects of fading. With the present state of the art, achieving true diversity reception in wireless communication requires complex antenna configurations.

Accordingly, there exists a need for a wireless communications system for achieving true diversity reception without having to use a complex antenna configuration.

It is therefore a feature of the present invention to overcome the above shortcomings related to wireless communications systems in general, and true diversity reception requirements in particular, by providing a method and apparatus for true diversity reception in a wireless communication system, wherein the true diversity reception is achieved with a single antenna.

In a first general aspect, the present invention presents a system for wireless communication, particularly for receiving communication signals, said system comprising: a main antenna structure, said antenna structure adapted to receive a communication signal as a first internal signal; and an antenna cable, said antenna cable having a first end operationally coupled to said main antenna structure and a second end, said antenna cable including a main conductor for passing said first internal signal, and a second receiving conductor, said second receiving conductor adapted to receive said communication signal as a second internal signal, and wherein said second receiving conductor as a receiving element is spatially separated from the main antenna structure.

In a second general aspect, the present invention presents a method of providing diversity reception in an antenna system, said method comprising: providing a main antenna structure, said main antenna structure adapted to receive a communication signal as a first internal signal; and providing an antenna cable, said antenna cable having a first end operationally coupled to said main antenna structure and a second end, said antenna cable adapted to receive said communication signal as a second internal signal, and wherein said outer shield acts as an antenna and is spatially separated from the main antenna structure. In a third general aspect, the present invention presents a wireless communication system comprising: a signal source for providing a communication signal; a first antenna for receiving said communication signal as a first internal signal, said first antenna operationally connected to an antenna cable; a second antenna for receiving said communication signal as a second internal signal on an outer shield of said antenna cable, said second antenna being spatially distinct from said first antenna, and wherein said outer shield provides an electromagnetic shield for said antenna cable; a signal receiver having a first input for receiving said first internal signal via said first conductor, and a second input for receiving said second internal signal via said second conductor, and signal processing circuitry operationally connected to said first input and said second input, said signal processing circuitry adapted to operationally modify said first internal signal and said second internal signal to produce a usable signal.

In a fourth general aspect, the present invention presents a method of wireless communication comprising: providing a signal source for providing a communication signal; providing a first antenna for receiving said communication signal on a first conductor, as a first internal signal; providing a second antenna for receiving said communication signal as a second internal signal on a second conductor, said second antenna being spatially distinct from said first antenna, and wherein said second conductor provides an electromagnetic shield for said first conductor; providing a signal receiver having a first input for receiving said first internal signal via said first conductor, and a second input for receiving said second internal signal via said second conductor; and providing signal processing circuitry operationally connected to said first input and said second input, said signal processing circuitry adapted to operationally modify said first internal signal and said second internal signal to produce a usable signal.

In a fifth general aspect, the present invention presents an apparatus containing a wireless communication system, said apparatus comprising: a first antenna for receiving a communication signal on a first conductor, as a first internal signal, said first antenna operationally connected to an antenna cable; a second antenna for receiving said communication signal as a second internal signal on an outer shield of the antenna cable of the first antenna; a signal receiver adapted to separate said first internal signal and said second internal signal; signal processing circuitry operationally connected to said first input and said second input, said signal processing circuitry adapted to operationally modify said first and second internal signals to produce a usable signal; and an electrical power source operationally coupled to, and adapted to provide electrical power to said signal receiver, said signal processing circuitry, and said first and second antennas.

The present invention has the advantage of achieving true diversity reception in a wireless communication system using only one antenna.

The foregoing and other features and advantages of the invention will be apparent from the following more particular description of embodiments of the invention. It is to be understood that both the foregoing general description and the following detailed description are exemplary, but are not restrictive, of the invention.

The features and inventive aspects of the present invention will become more apparent upon reading the following detailed description, claims and drawings, of which the following is a brief description.

The following is a detailed explanation of the structure and method for a antenna system which provides true diversity reception with a single antenna and its associated antenna cable, according to the present invention. It should be noted that the same reference numbers are assigned to components having approximately the same functions and structural features in the following explanation and the attached drawings to preclude the necessity for repeated explanation thereof.

In a wireless communications system, there are three components of interest to the present invention These are an antenna, a receiver, and an antenna cable which operationally connects the antenna and the receiver. The present invention makes use of the antenna effect of the antenna cable itself to provide true diversity reception of a single communication signal with a single antenna.

More specifically, it is possible to use the antenna effect of the antenna cable itself. When the antenna cable is exposed to a RF signal, a current (i.e., a skin current) is induced on the skin (e.g., in the shield, shell, or just below the "skin") of the antenna cable. The skin current is usually terminated at the receiver's antenna input, in order to eliminate interference with the antenna signal. In the present invention, however, the signal induced on the cable's outer conductive shell (or braid, or skin) can also be used. Because of the location of the cable, the signal from it is equivalent to the signal from distinct, spatially-separated antennas thus this embodiment is capable of providing true diversity reception with a single antenna.

The present invention may be implemented as a single assembly of an antenna terminal block or an adaptor. To extract two signals, radio frequency (RF) transformers or standard surface acoustical wave (SAW) filters or differential amplifiers or other devices can be used.

Figure 1:
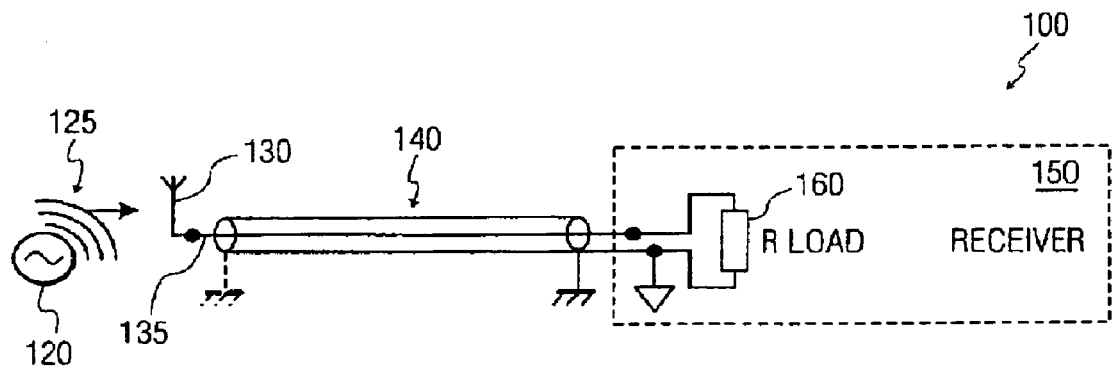
FIG. 1 is a schematic view of a communication network including single antenna reception.

Referring now to FIG. 1, a wireless communication system 100 featuring single antenna reception is illustrated. In FIG. 1, a radio frequency (RF) signal source 120 representing signal 125 which is received by antenna 130 provides one communication for the receiver. Antenna 130 in turn supplies a signal along antenna cable 135 to the receiver input represented here as an electrical load ("R-load") 160. The structure of antenna cable 130 is typically an electromagnetically shielded cable, (such as, inter alia, a coaxial pair, wherein the center conductor and the shield are an integral part of the RF transmission line), which includes an electromagnetic shield 140. Electromagnetic shield 140 is a conductive material in the form of, inter alia, a metal braid, jacket, or a solid outside shallow conductor.

In the scenario of FIG. 1, only currents induced in the antenna 130 will be fed into the receiver 150. In this case, the signal 125 is picked up at a single location, namely at the antenna 130. In wireless communications systems, however, there are frequently occasions wherein the received signal is subjected to the existence of so-called "dead spots", or nulls, for the received signal. A dead spot occurs when the reception point or the signal density pattern changes so that it is probable that the signal reception point will cross signal strength spots where the signal strength is very close to zero, or a zero, resulting in a dead spot where reception is impossible. Dead spots may be caused by reflections and superposition of the reflected and direct signals, such that signal density patterns are created which contain these dead spots. Further, dead spots may occur when the signal density pattern changes, for example due to the effects of weather, interference from flying objects that are not part of either the transmitting or receiving apparatus, etc.

One way to reduce the affects of such dead spots is to use diversity reception in the wireless communications system. Diversity reception systems require two different, spatially-separated antennas. An embodiment of a wireless communications system with diversity reception is illustrated in FIG. 2.

Figure 2:
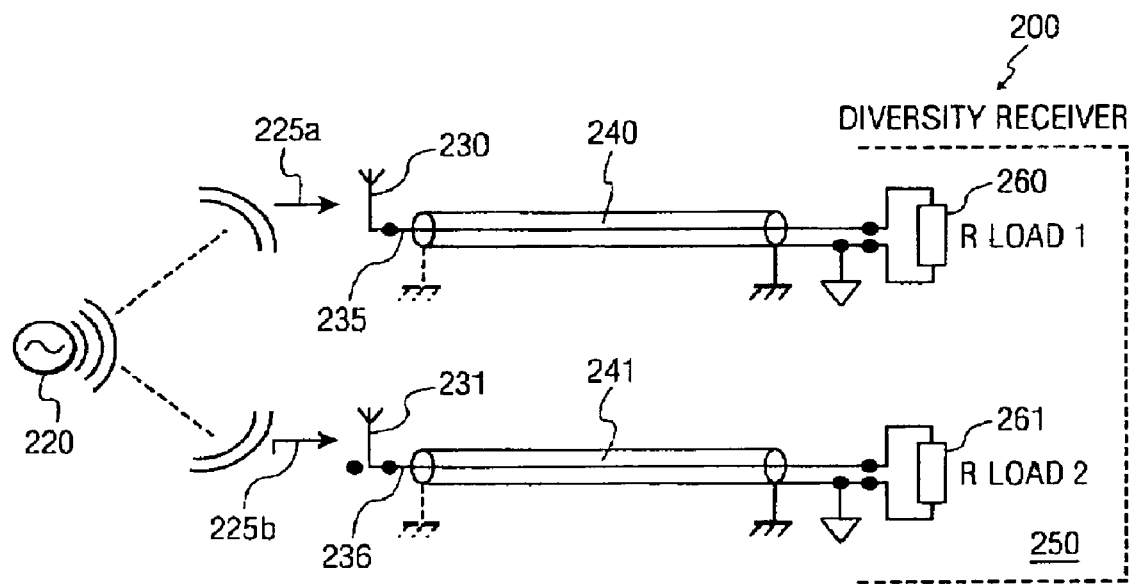
FIG. 2 is a schematic view of a communication network including true diversity reception with two spatially separated antennas.

In FIG. 2, wireless communications system 200 includes a RF signal source 220 which is induced by communication signal 225 which is received by a first antenna 230. First antenna 230 in turn supplies a first internal signal along first antenna cable 235 and electromagnetic shield 240 to electrical load ("R-load(1)") 260 representing receiver 250. The structure of first antenna cable 230 is typically an electromagnetically shielded cable, which includes an electromagnetic shield 240. Electromagnetic shield 240 must be a conductive material in the form of, inter alia, a metal braid or jacket Similarly, the communication signal 225a of wireless communications system 200 is also received by a second antenna 231, as communication signal 225b. In actuality, the first communication signal 225a and the second communication signal 225b are, in fact, the same communication signal. For the sake of clarity in this explanation, the signal source 200 is shown as providing two distinct signals 225a, 225b in order to emphasize the fact that the two signals 225a, 225b, as received at each antenna 230, 231, have a slightly different signal density pattern characteristic, due to the spatial displacement between the two antennas 230, 231. That is, the two antennas 230, 231 each receive the same communication signal 225a, 225b, they just receive it at a different location.

Second antenna 231 in turn supplies a second internal signal along second antenna cable 236 to electrical load ("R-load(2)") 261 representing receiver 250. The structure of second antenna cable 231 is typically the same as the first antenna cable 235, such as an electromagnetically shielded cable, which includes an electromagnetic shield 241. Electromagnetic shield 241 may be a conductive material in the form of, inter alia, a metal braid or jacket.

Since first antenna 230 and second antenna 231 are distinct and spatially-separated antennas, diversity reception may be achieved because the statistical probability of the coincidence of both the antennas 230, 231 hitting a dead spot in the communication signal density (i.e., strength) pattern at the same time is much less than for a single antenna such as that illustrated in FIG. 1. Thus, a diversity reception system having two spatially-separated antennas provides a much more stable system than the single antenna system of FIG. 1.

Figure 3:
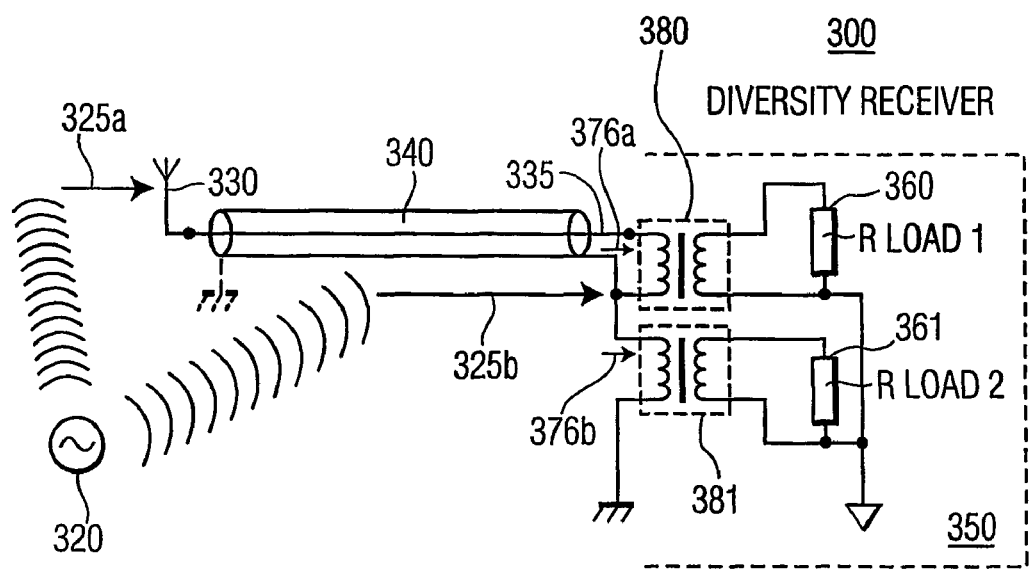
FIG. 3 is a schematic view of a communication network including true diversity reception with a single antenna in accordance with an embodiment of the present invention.

A general illustrative embodiment of the present invention is shown schematically in FIG 3. Wireless communication system 300 includes radio frequency (RF) signal source 320, induced by communication signal 325a, which is received by antenna structure 330. Antenna structure 330 is representative of any type of known wireless communication receiving device, such as, inter alia, a telescopic rod antenna found on an automobile. Antenna structure 330 in turn supplies a first internal signal 376a, corresponding to communication signal 325a, through the antenna cable 335, with its associated electromagnetic shield 340, to the input of a receiver represented as electrical load ("R-load (1)") 360 of receiver 350. Electrical load ("R-Load(1)") 360 represents signal processing circuitry known in the art and used for the processing of communication signal to produce signal which can be manipulated by an end user. The structure of antenna cable 335 is typically an electromagnetically shield 340 must be a conductive material in the form of, inter alia, a metal braid, jacket, or a solid outside shallow conductor. For illustrative purpose herein, the electromagnetic shield 340 may be considered conceptually as an independent conductor that acts as an antenna. However, in the embodiment of FIG 3. it is the electromagnetic shield 340 which acts as the second antenna.

The communication signal 325a of wireless communication system 300 of FIG. 3 is also received by antenna cable's electromagnetic shield 340 as second signal 325b. For the sake of clarity, the equivalent signal source 320 is shown as producing two distinct signals, the first equivalent signal 325a and the second equivalent signal 325b. Thus, second equivalent signal 325b is the signal 325a as it is received by the second antenna, which antenna is actually an antenna cable's electromagnetic shield 340. When communication signal 325b is received by electromagnetic shield 340, it becomes second internal signal 376b. Antenna cable's electromagnetic shield 340 thus acts as a second antenna, and as a second conductor, and supplies second internal signal 376b to the receiver input represented here as electrical load ("R-load(2)") 361 of receiver 350. R-load(2) 361 represents signal processing circuitry known in the art and used for the processing of first and second internal signals 376a, 376b in order to produce signals which can be manipulated by an end user. First decoupling device 380 provides signal extraction for the first internal signal 376a received on the antenna 330. Second decoupling device 381 provides signal extraction for the second internal signal 376b received on the antenna cable's electromagnetic shield 340. Decoupling devices 380, 381 represent any suitable device for isolating electrical communication signals, such as, inter alia, electronic filters, transformers, transistors, differential amplifiers and other devices suitable for the task Generally speaking, the signals from the first and second antennas are not isolated from each other. Rather, they exist simultaneously on both the inner main conductor and the outer shield. However, the two signals exist in different "differential domains." Thus, when the signals are separated at the antenna input terminals of the receiver, signal processing circuitry utilizes "differential reference points" are used to extract the two signals produced by the antenna and the outer shield.

In one embodiment, the present invention may be applied to an automobile radio receiver. In this scenario, the antenna structure 330 is the rod antenna typically mounted on a fender of the automobile. The antenna cable 335, with electromagnetic shield 340, connects the antenna structure 330 to the receiver 350 mounted in the dashboard of the automobile. Thus, there is a length of antenna cable 335, and electromagnetic shield 340, which is situated at a spatially distinct location from the antenna structure 330. The antenna cable 335 includes the antenna cable electromagnetic shield 340. As discussed supra, for the purposes of this invention, the antenna cable's electromagnetic shield 340 is treated a second antenna. Since the dashboard-mounted portion of the antenna cable electromagnetic shield 340 is located in a spatially distinct location and exposed to the communication signal and is treated as a second antenna, the effective result is that true diversity reception may be achieved with a single antenna.

Embodiments of the present invention have been disclosed. A person of ordinary skill in the art would realize, however, that certain modifications would come within the teachings of this invention. For example, rather than the single device embodiment discussed herein regarding FIG. 3, the present invention also encompasses embodiments wherein there are a plurality of antennas and/or a plurality of receivers. Therefore, the following claims should be studied to determine the true scope and content of the invention.

The invention claimed is:

1. An antenna system for receiving diversity signals from a single antenna, comprising: a single antenna connected to a receiver by an inner conductor and an outer conductor of a coax cable; said inner and outer conductors receiving a signal from a transmitter; a first device for differentially extracting a first diversity signal from said received signal across said inner conductor and outer conductor at a near end of said coax cable in a differential mode; and a second device for single-ended extraction of a second diversity signal from said received signal, said second device extracting said second diversity signal from said outer conductor of said coax cable in a common mode; wherein said first and second diversity signals provide reception of truly spatially diverse communication signals from transmitter by receiver.

2. The antenna system of claim 1, further comprising:
   a first transformer (380) with its primary windings connected across said inner conductor and outer conductor (340) at a near end of said coax cable (335), and its secondary windings providing an output fix said first diversity signal (376a) to a first receiver input load (360); and
   a second transformer (380) with its primary windings connected to said outer conductor (340) at a near end of said coax cable (335), and a local ground, and its secondary windings providing an output for said second diversity signal (376i b) to a second receiver input load (361);
   wherein, said primary windings of the first and second transformers (380 and 381) are stacked in series with each other.

3. A method for obtaining two diversity signals from a single antenna and coax cable, comprising: connecting a single antenna to a receiver by an inner conductor and an outer conductor of a coax cable; said inner and outer conductors receiving a signal from a transmitter; differentially extracting a first diversity signal from said received signal across said inner conductor and outer conductor at a near end of said coax cable at a first input of said receiver; and single-endedly extracting a second diversity signal from said received signal, said second diversity signal is extracted from said outer conductor of said coax cable with reference to a local ground at a second input of said receiver; wherein said first and second diversity signals provide reception of truly spatially diverse communication signals from said transmitter by said receiver.

* * * * *